Dec. 14, 1937.   R. L. SMITH   2,102,288
SIGNALING MEANS FOR VEHICLES
Filed June 27, 1935   3 Sheets-Sheet 1

Inventor
Roland L. Smith
by Charles Y. Chittick
Attorney

Dec. 14, 1937.    R. L. SMITH    2,102,288
SIGNALING MEANS FOR VEHICLES
Filed June 27, 1935    3 Sheets-Sheet 2

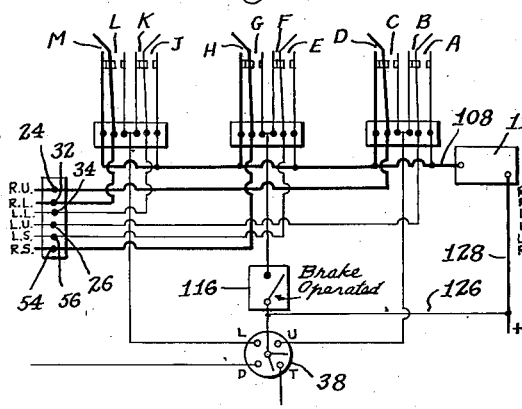

Fig. 4.

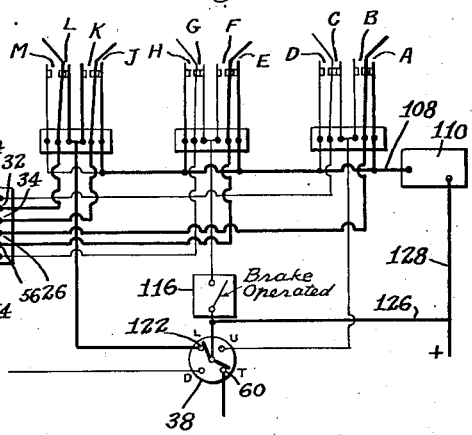

Fig. 5.

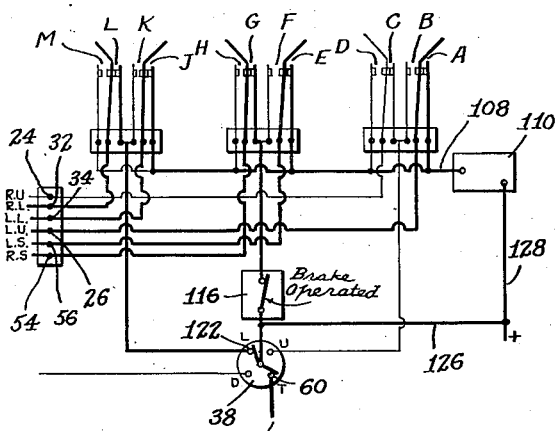

Fig. 6.

- SYMBOLS -

R.U.= Right Headlight, Upper Beam Filament.
R.L = Right Headlight, Lower Beam Filament.
L.L.= Left Headlight, Lower Beam Filament.
L.U.= Left Headlight, Upper Beam Filament.
L.S.= Left Stop Light.
R.S.= Right Stop Light.

On Main Lighting Switch 38
- U = Upper Beams
- L = Lower Beams
- D = Dimmers
- T = Tail Lights ——————— Current Flowing
——  ——  —— No Current Flowing

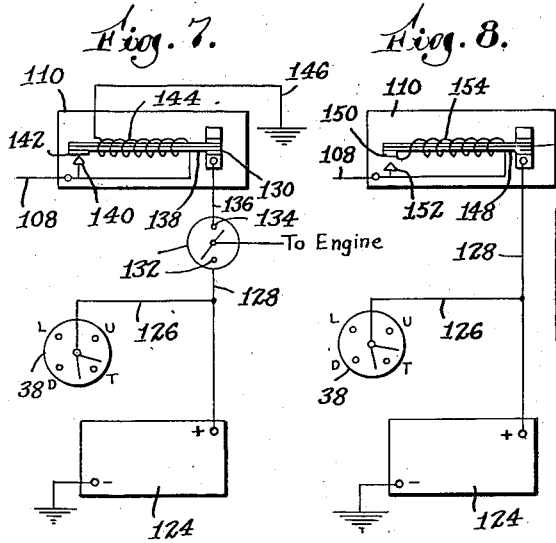

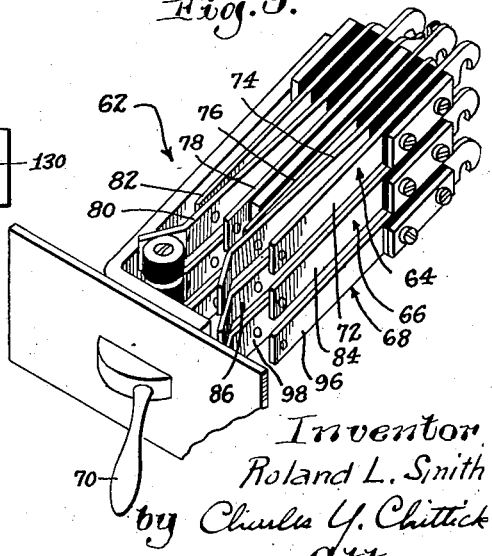

Fig. 9.

Inventor
Roland L. Smith
by Charles Y. Chittick
Attorney

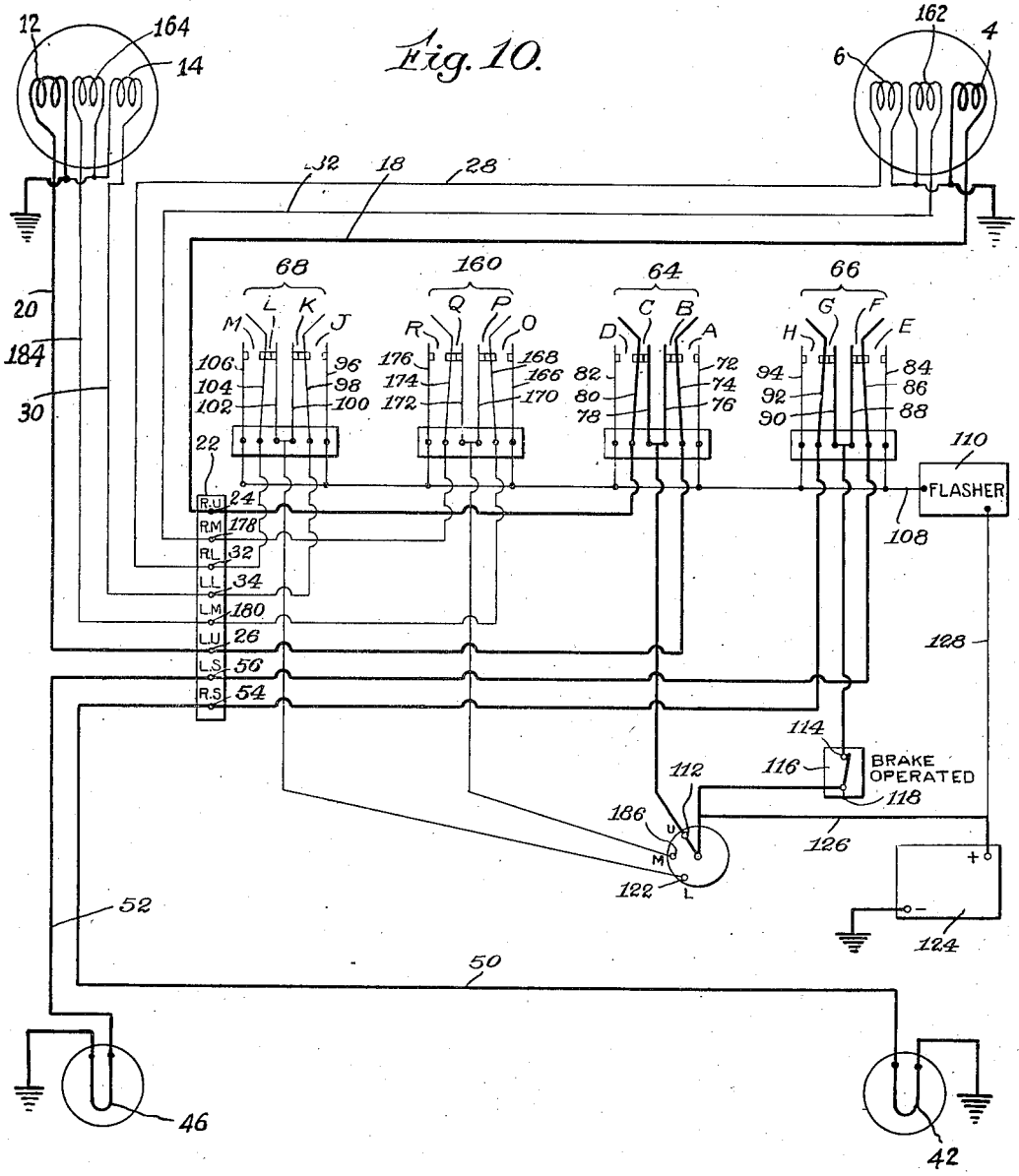

Patented Dec. 14, 1937

2,102,288

UNITED STATES PATENT OFFICE 2,102,288

SIGNALING MEANS FOR VEHICLES

Roland L. Smith, Belmont, Mass.

Application June 27, 1935, Serial No. 28,616

13 Claims. (Cl 177—337)

This invention relates to signaling devices for use with automotive vehicles. One of the objects of this invention is to provide a switching and flashing mechanism which may be incorporated in the electrical circuit of a vehicle to cause the lights of the vehicle to flash in such a way as to indicate the intentions of the operator, to both oncoming and following vehicles.

Another object of my invention is to provide a signaling mechanism which does not involve the addition of any parts to the outside of the car, leaving the vehicle unchanged in appearance.

Another object of my invention is to provide a signaling device which is equally effective in the daytime or nighttime, and which is capable of operation at any time regardless of the setting of the lights. That is to say, my device is equally effective whether the lights be off or on, or whether the high beams, the low beams, the dimmers, the tail lights, or the stop lights be in use.

Heretofore signaling devices have been provided which operated by the intermittent action of one or more of selected lights; but such systems were only available on relatively elemental lighting systems.

With the highly developed lighting systems such as are used on automobiles or trucks today, no switching and flashing mechanism has heretofore been available capable of causing the lights to flash under any and all settings of the stop lights and lighting switches.

By my switching and flashing mechanism it is possible to cause either the right lights or left lights to flash at will, the lights on the opposite side of the car remaining in their original condition.

Other objects and additional details of the mode of operation will appear in the more detailed explanation to follow, reference being made, of course, to the accompanying drawings, in which Fig. 1 is a diagram of my wiring system showing the switches set for night driving, using the upper beams of the headlights. The stop light switch has also been applied.

Fig. 4 shows the setting of the switches necessary to cause the lights on the right side of the car to flash, while the lights on the left are out. This is a typical daytime situation.

Fig. 5 shows the setting of the switches to cause the lights on the left of the car to flash, while the lights on the right remain steady. In this setting the lower beam of the right headlight is in normal use, and the stop light switch is open.

Fig. 6 shows the switches set the same as in Fig. 5, with the exception that the stop light switch has been closed.

Fig. 7 shows the wiring of one type of flasher that I have found suitable for use in my system.

Fig. 8 shows another type of flasher which can be used with my system.

Fig. 9 is a perspective view of my signaling switch, set to cause the lights on the right of the car to flash.

Fig. 10 is a diagram of my wiring system in which an extra bank of switches has been incorporated to control additional filaments.

In the drawings, like parts are designated by the same numbers. The heavy lines in the wiring diagrams indicate the flow of the current.

Figure 1:
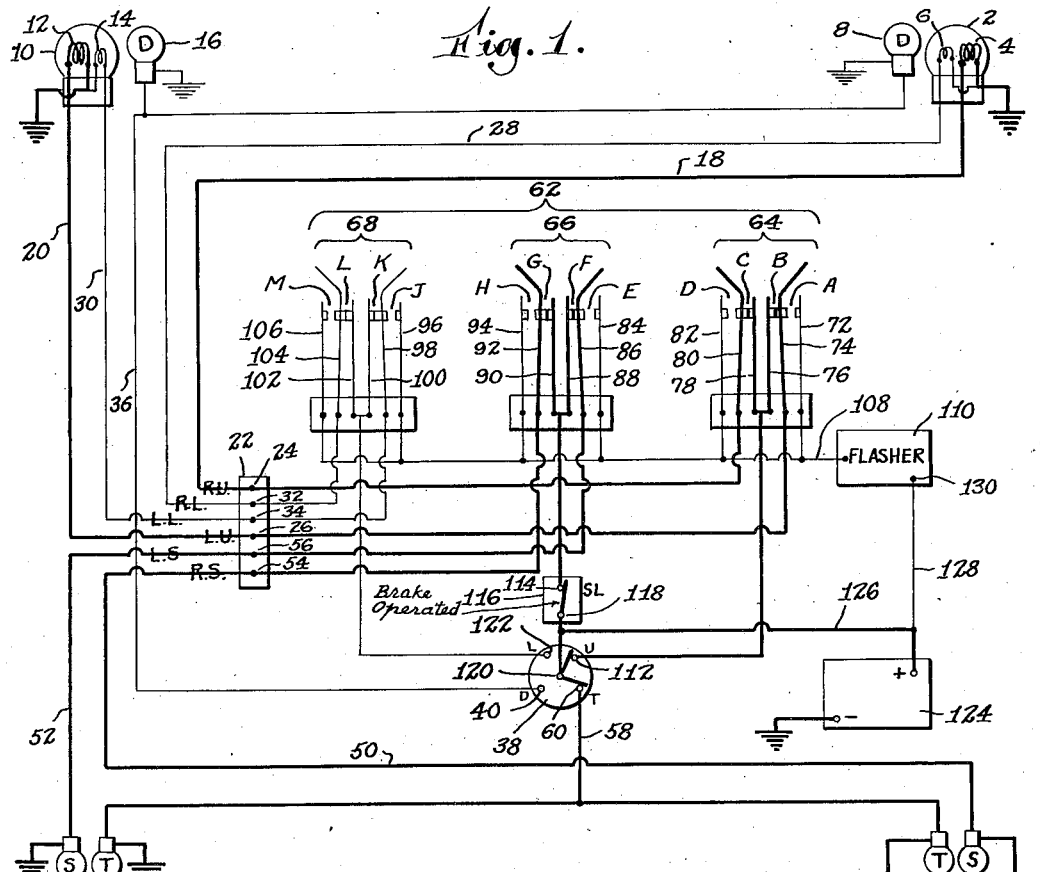

Fig. 1 shows the complete wiring diagram for a system incorporating my invention. This wiring arrangement is the same as that commonly used on passenger automobiles today, with the addition of my signaling switch and flashing mechanism. In the front right headlight of the car is the usual double-filament bulb 2, having an upper beam filament 4, and a lower beam filament 6. In addition, there is the dimmer bulb 8.

At the front left of the car is the double-filament bulb 10, having an upper beam filament 12, and a lower beam filament 14, and a dimmer bulb 16. The common return circuit from the filaments in these several bulbs is grounded in the usual manner.

Connecting the upper beam filaments 4 and 12 with the terminal block 22 are the leads 18 and 20, secured to terminal block 22 at terminals 24 and 26 respectively. Leads 28 and 30 connect lower beam filaments 6 and 14 to the terminal block 22, at terminals 32 and 34 respectively. A common lead 36 connects dimmers 8 and 16 with the main lighting switch 38, at terminal 40.

It should be pointed out at this time that the operation of the dimmers 8 and 16 is entirely independent of the flashing mechanism, that is to say, at no time do the dimmers flash.

At the rear of the car are the lights commonly known as tail lights and stop lights. The right stop light is designated as 42, and the right tail light as 44. The left stop light is marked 46, and the left tail light 48. Stop lights 42 and 46 are connected to the terminal block 22 by leads 50 and 52 respectively at terminals 54 and 56. The tail lights 44 and 48 are connected to main lighting switch 38 by the common lead 58 at terminal 60. The tail and stop lights are of course grounded in the usual manner. Tail lights 44 and 48 being connected directly to main lighting switch 38 are unaffected by the operation of the flashing mechanism.

Connected to terminal block 22 is switch 62 shown in perspective in Fig. 9, and diagrammatically in Figs. 1, 2, 3, 4, 5, and 6. This switch is composed of three identical banks 64, 66, and 68, all three banks being operated simultaneously through the movement of lever 70 shown in Fig. 9.

For purposes of explanation, the several fingers in the three banks of switches have been numbered as follows. In bank 64,—72, 74, 76 78, 80, and 82. In bank 66,—84, 86, 88, 90, 92, and 94. In bank 68,—96, 98, 100, 102, 104, and 106. The contacts are designated in bank 64,—A, B, C, and D. In bank 66,—E, F, G, and H. In bank 68,—J, K, L, and M. Fingers 72, 82, 84, 94, 96, and 106 are connected by a common lead 108 to the flashing mechanism 110. Finger 74 is connected to the left upper beam filament 12 at terminal 26. Fingers 76, 78 are connected by a common lead to terminal 112 of the lighting switch 38. Finger 80 is connected to the right upper beam filament 4 at the terminal 24.

Finger 86 is connected to the left stop light at terminal 56. Fingers 88 and 90 are connected by a common lead to one pole 114 of the foot pedal actuated stop light switch 116. The other pole 118 of the stop light switch 116 is connected to the common pole 120 of lighting switch 38. Finger 92 is connected with the right stop light at terminal 54. Finger 98 is connected with the left lower beam filament 14, at terminal 34. Fingers 100 and 102 are connected by a common lead to terminal 122 of lighting switch 38. Finger 104 is connected to the right lower beam filament 6 at terminal 32.

From the foregoing, it is seen that bank 64 is connected with the upper beam filaments, bank 66 with the stop lights, and bank 68 with the lower beam filaments. Dimmers 8 and 16, and tail lights 44 and 48 are connected directly to lighting switch 38 at terminals 40 and 68 respectively. Battery 124 is connected by lead 126 in the usual manner to lighting switch 38 at common terminal 120. Another lead 128 runs from battery 124 to the flasher 110, being connected thereto at terminal 130.

When signaling switch 62 is in neutral position, that is, so set that none of the lights are flashing, the contacts of the various banks are in the position shown in Fig. 1. That is to say, contacts A, D, E, H, J, and M are open, while contacts B, C, F, G, K, and L are closed.

Figures 2, 3:
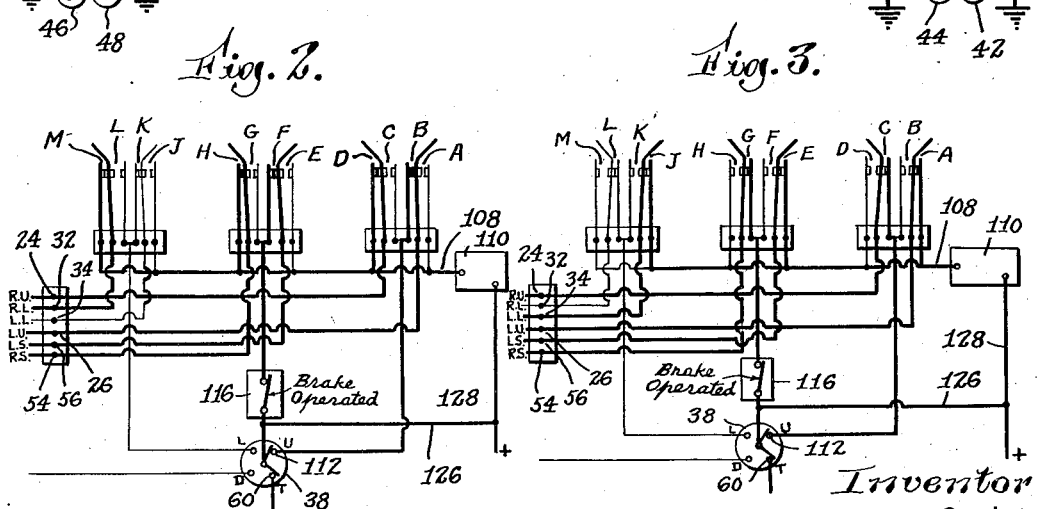
Fig. 2 shows a setting of the switches to cause the lights on the right of the vehicle to flash, while the lights on the left of the vehicle remain steady as in Fig. 1.
Fig. 3 shows the setting of the switches to cause the lights on the left side of the car to flash, while the lights on the right side of the car remain steady as in Fig. 1.

Signaling switch 62 is normally positioned on the dash of the automobile or elsewhere if desired, the handle 70 being within easy reach of the driver. By means of the construction shown in Fig. 9, or by any other suitable mechanism, movement of lever 70 to the right will cause the various contacts to take the positions shown in Figs. 2 and 4, whereas throwing lever 70 to the left will cause the contacts to take the positions shown in Figs. 3, 5, and 6. Thus when lever 70 is moved to the right, contacts A, C, E, G, J and L will be open, while contacts B, D, F, H, K, and M will be closed. When lever 70 is thrown to the left, contacts A, C, E, G, J, and L will be closed, while contacts B, D, F, H, K, and M will be open as shown in Figs. 3, 5, and 6.

Two types of flashers suitable for use in my invention are shown in Figs. 7 and 8, but any other type of flasher accomplishing the same results could be used in place thereof. In the form shown in Fig. 7, lead 128 goes from the battery 124 to terminal 132 of the ignition switch. From the other terminal 134 of the ignition switch, a lead 136 goes to terminal 130 of the flasher 110. The flasher consists of a bi-metallic element 138, anchored at one end, and making contact at the other end with terminal 140, by means of contact member 142. Surrounding bimetallic member 138, but insulated therefrom, is a heating coil 144, running from terminal 140 to ground 146. Terminal 140 is in turn connected with lead 108 which is associated with the three banks of switches 64, 66, and 68.

The operation of the flasher is as follows. When the ignition switch is turned on, current flows from the battery 124 through leads 128, 136 to terminal 130, through bi-metallic element 138, to contact 142, to terminal 140, through the heating element 144 to the ground 146. In this condition the circuit from lead 128 to lead 108 is closed, but the heating effect of coil 144 on bi-metallic element 138 causes the latter to bend upwardly breaking the contact at 142 so that the circuit between lead 128 and 108 is broken. Upon the breaking of the circuit at 142, current ceases to flow through heating coil 144, whereupon bi-metallic element 138 cools and bends downwardly, renewing the contact between 142 and terminal 140, whereby current again flows through heating coil 144 and the circuit is completed to lead 108. This making and breaking of the circuit is therefore repeated over and over again as long as the ignition switch remains closed. With this type of flashing mechanism, the circuit to lead 108 is being made and broken continually, as long as the ignition switch is on, regardless of the setting of signaling switch 62.

The construction of the flasher shown in Fig. 8 is slightly different. The lead 128 goes directly from the battery to terminal 130 of the flasher 110. Secured at one end in the flasher is a bi-metallic element 148, having at its other end a contact 150 which is normally separated from terminal 152. Running from contact 150, about bi-metallic element 148 but insulated therefrom, is the heating coil 154 connected at its other end to terminal 152. If the signaling mechanism 62 is so set to call for current through lead 108, current will flow through heating coil 154 sufficient to heat bi-metallic element 148, but insufficient to cause incandescence of any of the lighting filaments. The heating of bi-metallic element 148 causes it to bend downwardly, making contact between contact 150 and terminal 152, whereby a sufficient amount of current may flow through leads 128 and 108 to cause incandescence of the various lighting filaments. Closing of contacts 150 and 152, however, short circuits the heating element 154, whereby the latter cools, and bi-metallic element 148 is caused to swing upwardly breaking the circuit between contact 150 and terminal 152. Thereupon current again flows through heating element 154, and the operation is repeated. Thus, with the flasher shown in Fig. 8 no operation takes place until the signaling switch 62 is set to call for current through lead 108.

The operation of my system can best be understood by reference to the accompanying drawings. Under normal conditions the signaling switch is in off position, resulting in the contacts being as shown in Fig. 1. The main lighting switch 38 is operated to set the lights in any desired condition. In Fig. 1 switch 38 has been set to operate the upper beam filaments of the headlights through contact 112, the tail lights through contact 60, and the stop lights through stop light switch 116. Current will flow as indicated by the heavy lines in Fig. 1.

If, when driving under the lighting conditions shown in Fig. 1, it is desired to indicate that a turn to the right is to be made, lever 70 is thrown to the right, resulting in a new series of contacts shown in Fig. 2. Contacts D, H, and M are now closed, resulting in current flowing through lead 108, causing the resulting current that goes to upper beam filament 4 and lower beam filament 6 of the front right head light to be of an intermittent character, and likewise the current going to the right stop light through terminal 54 is intermittent, causing the right stop light to flash as well. Thus, by setting the signaling switch 62 to the position of Fig. 2, both filaments in bulb 2 and the stop light 42 are caused to flash, while the upper beam filament 12, and the left stop light 46, as well as both tail lights 44 and 48 burn continuously.

When it is desired to indicate a left turn with the lights set initially as shown in Fig. 1, lever 70 is thrown to the left, causing the various contacts to take the position shown in Fig. 3. In this position contacts A, E, and J, which were open in Fig. 1 are now closed, and intermittent current, due to operation of flasher 110, is drawn through leads 128 and 108, passing through terminals 34, 26, and 56, causing both the upper and lower beam filaments 12 and 14 of left headlight bulb 10 to flash, and also causing left stop light 46 to flash. At the same time upper beam filament 4 of right headlight 2, and right stop light 42 along with tail lights 44 and 48 burn continuously.

From the foregoing it can be seen that the operation of my signaling mechanism causes both the upper and lower beam filaments on one side of the car to flash, while only a single filament burns on the opposite side, and at the same time, the corresponding stop light is caused to flash while the other stop light either burns continuously or is off altogether, depending on whether stop light switch 116 is closed or open.

Fig. 4 shows the situation during the daytime when the light switch 38 is in off position. In daytime operation all of the lights are normally out. When it is desired to indicate a right turn, lever 70 is thrown to the right, resulting in the switches taking the position shown in Fig. 4. Current will then flow as indicated by the heavy lines, traveling from the battery through lead 128, through the flasher 110, and through contacts D, H, and M, resulting in the flashing of the right upper beam filament and right lower beam filament of right headlight bulb 2, and the right stop light 42. All of the lights on the left of the car will remain out, since the main lighting switch 38 is in off position. If the operator, by operating the brake pedal should close stop light switch 116, current would then also flow from the battery through lead 126, through stop light switch 116, through contact F, to terminal 56, and on to the left stop light 46. Stop light 46 would of course burn continuously as long as stop light switch 116 remained closed, but stop light 42, on the right, would flash as long as the switches remained in the position shown in Fig. 4. Conversely, throwing lever 70 to the left, with main lighting switch 38 off, will result in the lights on the left of the car flashing while those on the right are out.

In the diagram shown in Fig. 5 the situation is the same as in Fig. 3 with the exception that main lighting switch 38 has been set to cause the lower beam filaments of the headlights to be on instead of the upper beam filaments. Lever 70 has been thrown to the left, closing contacts A, E, and J. This results in current flowing from the battery through lead 128, flasher 110, lead 108, through contacts A, E, and J, terminals 34, 26, and 56, which in turn causes the left upper beam filament, left lower beam filament, and the left stop light to flash, while the right lower beam filament, and both tail lights 44 and 48 burn continuously. If stop light switch 116 should be applied, the right stop light 42 would go on and burn continuously by virtue of current flowing through lead 126, stop light switch 116, contact G, terminal 54, to the stop light 42.

The situation just referred to, that is, with the stop light signal switch 116 on, is shown in Fig. 6. Otherwise the setting of the switches is the same as shown in Fig. 5.

For purposes of clarity, certain symbols have been used in the various wiring diagrams, and the explanation of these symbols is set forth in a schedule in the drawings. It should again be pointed out that the operation of the dimmers 8 and 16, and the tail lights 44 and 48 is entirely independent of the signaling and flashing mechanism. Since the dimmers and tail lights are usually of less candle power than the headlights 2 and 10, and stop lights 42 and 46, it is obviously desirable that the flashing be done by the headlights and stop lights to insure that the signals be seen by other operators during the day as well as at night. However, it is obvious that the candle power of the filaments in the bulbs used in my signaling circuits may be of any desired strength. By the addition of other banks of switches similar to banks 64, 66 and 68, additional filaments can be introduced and caused to flash in a manner similar to the present flashing filaments.

Such a modification as just referred to is shown in Fig. 10. In this figure, which is practically the same as Fig. 1 as far as my signaling mechanism is concerned, the dimmers and tail lights have been omitted. However, as pointed out before, the dimmers and tail lights are not connected with my signaling system and in no way affect the operation. The circuit shown in Fig. 10 includes the original banks of switches 64, 66, and 68 which have previously been described and it also includes an additional bank of switches 160. This extra bank is for the purpose of controlling additional filaments which have been added to the head lights and are numbered 162 in the right head light and 164 in the left head light.

Bank 160 would be merely added to the three banks shown in Fig. 9 and would be under the control of lever 70.

Bank 160 is composed of several fingers, 166, 168, 170, 172, 174 and 176 and the contacts are designated O, P, Q and R. When bank 160 is in its normal position contacts P and Q are closed and O and R are open. Fingers 166 and 176 are connected to the common lead 108 extending to the flashing mechanism 110. Fingers 174 and 168 are connected to the terminal block 22 at terminals 178 and 180 and from these terminals extend leads 182 and 184 to filaments 162 and 164 respectively.

In this arrangement a new terminal 186 connected with the middle beam filaments has been added to main light switch 38. The other terminals on the main lighting switch, namely, 112 for the upper beam filaments and 122 for the lower beam filaments remain the same. The dimmer and tail light contacts 40 and 60 have been eliminated as they are not involved in the circuit.

The operation of this construction is as follows. If the operator is driving in the daytime with all lights off switch 38 will be open so that no current will flow to banks 64, 160 or 68 and if the brake is not being operated brake switch 116 will be open so that no current will flow to bank 66. If the operator then desires to make a right or left turn he will throw lever 70, shown in Fig. 9, in the appropriate direction. Assume that lever 70 is thrown to the right. The following contacts will then be made. Contacts E, F, A, B, O, P, J and K will remain as shown in Fig. 10. Contacts G, C, Q and L will be opened and contacts H, D, R and M will be closed. As soon as this happens current will flow from the battery 124 through wire 128 to flasher 110 and thence to the four banks of switches which will distribute intermittent current to all the filaments on the right side of the vehicle. Thus bank 66 will send intermittent current to the right stop light filament 42, bank 64 will send intermittent current to the right upper head light filament 4, bank 160 will send intermittent current to the right middle head light filament 162 and bank 68 will send intermittent current to the right lower head light filament 6. Thus all the lights on the right of the car will flash while all of the lights on the left of the car will be out.

From the foregoing operation it is obvious that if the lever 70 is thrown to the left the filaments on the left will be caused to flash while the filaments on the right remain out.

If, on the other hand, the driver is operating at night and main lighting switch 38 is set as shown in Fig. 10 current will normally flow as shown by the heavy lines, with the result that the upper head light filaments 4 and 12 on the right and left are lighted. In the showing in Fig. 10 the brake switch 116 is also shown as closed so that current is flowing to both stop lights 42 and 46.

If under these circumstances the operator wishes to indicate a turn to the right and so throws lever 70 in that direction the following operation takes place. Contacts F and B, which are receiving continuous current through switch 38, remain closed so that filaments 12 and 46 on the left continue to receive continuous current. Contacts G and C, however, which up to this time were supplying filaments 4 and 42 with continuous current are broken and contacts H and D are closed with a result that filaments 4 and 42 receive intermittent current. At the same time contacts R and M are closed so that filaments 162 and 6, which previously were receiving no current, now receive intermittent current. From this description it can be seen that when the car is operated at night movement of lever 70 to the right will cause all filaments on the right to flash while the condition of the filaments on the left remains unchanged.

A similar condition would hold if main lighting switch 38 were set to supply continuous current to middle beam filaments 162 and 164 or to the lower filaments 6 and 14.

Thus Fig. 10 is illustrative of the manner in which additional banks of switches may be added to my circuit to control a greater number of filaments on either or both sides of the vehicle.

In my preferred form, signaling switch 62, shown in Fig. 9 is so constructed that when lever 70 is thrown to the right or to the left it will remain in position until restored to neutral by the operator. This construction may be varied if desired, however, I prefer the construction of the switch 62 to that type that must be manually held to the right or to the left to cause the lights to flash, as, in the former, the driver's hands are free for control of the automobile. I also find my present construction preferable to the time switch type which automatically returns to neutral position after the lights have been flashing for a predetermined length of time, for the reason that, in the latter, the signaling means may cease prematurely.

From the foregoing illustrative wiring diagrams, it can be seen that operation of lever 70 of signaling switch 62 to the right or to the left will cause the headlight and the stop light on one side of the vehicle to flash regardless of the setting of the other lights under the influence of main lighting switch 38 or stop light switch 116. In other words, the introduction of my switch 62 in no way affects the ordinary operation of the lights when lever 70 is in neutral position and the signaling switches are as shown in Fig. 1. Operation of lever 70 to the right or the left causes both beams in the headlight and tail light on the corresponding side to flash, the lights on the opposite side being unaffected.

I believe therefore that this constitutes a definite advance in the art or signaling on vehicles, and I believe my arrangement of parts results in a mode of operation heretofore unobtainable.

It is to be distinctly understood, however, that my invention is not limited to any particular form of switching mechanism, or flashing mechanism, as the foregoing is illustrative only. My invention is to be limited only by the appended claims.

I claim:

1. In a lighting and signaling system for vehicles, a source of current, a plurality of right front light filaments, a plurality of left front light filaments, a right rear filament, a left rear filament, each filament connected with said source of current by two parallel circuits, only one of said circuits being operative at any given time, means for closing certain of said circuits to supply continuous current to light certain of said right and left front filaments and said right and left rear filaments, means for changing the current to previously lighted filaments on one side of said vehicle from continuous to intermittent and at the same time supplying intermittent current to all previously unlighted filaments on the same side.

2. In a lighting and signaling system for vehicles, a source of current, a plurality of right front light filaments, a plurality of left front light filaments, a right rear filament, a left rear filament, each filament connected with said source of current by parallel circuits, switching means for closing simultaneously certain circuits to supply intermittent current to all filaments on one side only, other circuits connecting said source of current with said filaments and other switching means for closing or opening certain of said other circuits for supplying continuous current to certain but not all previously unlighted filaments on the other side of said vehicle.

3. An automobile signaling system comprising a source of electric current, at least six lighting filaments connected thereto in parallel, two filaments located at the front right, two filaments at the front left, one filament at the rear right, one filament at the rear left of said automobile, at least two manually operated switches having a plurality of "on" positions in each circuit between said source of current and each of said filaments, and an additional parallel circuit to each filament including an automatic intermittently operated switch, said circuits and switches constituting means for supplying continuous current simultaneously to all of said filaments except one front right filament and one front left filament, said circuits and switches also constituting means for intermittently operating all of the filaments on one side of the automobile and continuously operating one front filament and the rear filament on the opposite side of the automobile.

4. A signaling system for vehicles comprising a source of electric current and a plurality of lighting filaments, one-half on the right and one-half on the left of said vehicle, a pair of parallel circuits connecting said source and each of said filaments, one circuit of each pair of circuits including a main switch, and a signaling switch said main switch having contacts whereby some but not all said one circuits may be closed at one time, the other circuits of each pair of circuits including an intermittently operated switch and said signaling switch to supply intermittent current to said filaments, said signaling switch when in non-signaling position having all of said one circuits closed, said signaling switch when in signaling position having one-half of said other circuits closed.

5. In a signaling system for vehicles, a source of current, a plurality of filaments distributed on the right and left of said vehicle, means for supplying continuous current to any selected filaments, means for supplying continuous current to selected but not all said filaments, means for discontinuing said continuous current to the filaments on one side and means for thereafter supplying intermittent current to all of the filaments on the side from which continuous current has been discontinued.

6. In a signaling system for vehicles, a source of current, a plurality of lighting filaments each having at least two parallel circuits thereto, some of said filaments positioned on the right of the vehicle, the remaining filaments positioned on the left of the vehicle, dual control means for said filaments, one control providing for a supply of continuous current and actuating some, but not all, of said filaments on both sides of the vehicle, the other control providing for a supply of intermittent current and actuating all of the filaments on one side or the other of the vehicle, said first control positioned in said continuous current circuits only, said other control positioned in both the continuous current circuits and the intermittent current circuits.

7. In a signaling system for vehicles, a source of current, two pairs of filaments, each filament connected to the current source by at least two parallel circuits, one pair of filaments on the right, the other pair on the left of the vehicle, means for lighting simultaneously one filament of each pair of filaments with continuous current, means for discontinuing continuous current to one of said lighted filaments and means for thereafter supplying intermittent current to both filaments of one pair.

8. A signaling system for vehicles, comprising upper and lower beam right front filaments and upper and lower beam left front filaments, a source of current and parallel circuits to each of said filaments, one circuit to each filament including automatic make and break means, switching means for lighting the upper or lower beam filaments simultaneously with continuous current and other switching means for discontinuing the continuous current to one of the lighted filaments and at the same time permitting intermittent current to be supplied to the upper and lower beam filaments on the same side.

9. A signaling system for vehicles comprising upper and lower beam filaments on the front right and front left of said vehicle, normal lighting means for said filaments including a source of current, circuits to each filament, and a switch whereby either the upper or lower beam filaments may be supplied with continuous current, other parallel circuits to said filaments including an automatic make and break device and a second switch common to said other circuits whereby intermittent current may be supplied to both right or both left filaments, said second switch including means for breaking the continuous current circuits to the filaments to which intermittent current is being supplied.

10. A signaling system for vehicles comprising upper and lower beam filaments in the right and left headlights, and means for supplying simultaneously intermittent current to both upper and lower beam filaments in either the right or left headlight, and means for supplying continuous current to either the upper or lower beam filaments of the other headlight.

11. A signaling system for vehicles comprising a source of electric current and a plurality of lighting filaments on the right and left of said vehicle, a pair of parallel circuits connecting said source and each of said filaments, and means in one of said circuits to provide continuous current to all but one filament on either side of said vehicle and means in the other of said circuits to provide intermittent current to all filaments on one side or the other when continuous current is not being supplied thereto.

12. A signaling system for vehicles comprising at least two filaments in the right headlight and an equal number of filaments in the left headlight, means for supplying simultaneously intermittent current to all filaments in either the right or left headlight and means for supplying continuous current to any one of the filaments of the other headlight.

13. A signaling system for vehicles comprising at least two filaments in the right headlight and an equal number of filaments in the left headlight, at least one right rear light and one left rear light, means for supplying simultaneously intermittent current to all filaments on the right or left of said vehicles and means for supplying at the same time continuous current to less than all the headlight filaments and to the tail light filament on the opposite side of said vehicles.

ROLAND L. SMITH.